(12) United States Patent
McKinnon (10) Patent No.: US 8,820,628 B2
(45) Date of Patent: Sep. 2, 2014

(54) ENABLING DISTANT READING OF SCANNABLE CODES

(76) Inventor: Thomas E. McKinnon, Big Bear, CA (US)

( * ) Notice: Subject to any disclaimer, the term of this patent is extended or adjusted under 35 U.S.C. 154(b) by 78 days.

(21) Appl. No.: 13/590,711

(22) Filed: Aug. 21, 2012

(65) Prior Publication Data

US 2014/0054386 A1 Feb. 27, 2014

(51) Int. Cl.
*G06F 17/00* (2006.01)
(52) U.S. Cl.
USPC ........................................................ 235/375

(58) Field of Classification Search
USPC ......................................................... 235/375
See application file for complete search history.

(56) References Cited

U.S. PATENT DOCUMENTS 8,439,275 B2 * 5/2013 Cok .............................. 235/494

* cited by examiner

*Primary Examiner* — Jamara Franklin
(74) *Attorney, Agent, or Firm* — Century IP Group, Inc.; F. Jason Far-hadian, Esq.; Ronald Ugolick (57) ABSTRACT

A system for displaying a QR code in vicinity of a commercial sign, the system comprising a panel comprising a QR code displayed thereon; and a fastener to attach the QR code panel to a signage system such that size of the QR code is larger than a 2×2 cm square where interested parties are able to scan the QR code from more than 10 feet away.

18 Claims, 9 Drawing Sheets

ENABLING DISTANT READING OF SCANNABLE CODES

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to commercial signs having scannable codes, and particularly to quick response (QR) codes displayed in association with commercial signs.

BACKGROUND

Most commercial signs do not provide all of the information that a consumer may need to make an informed decision. For example, real estate "for sale" or "for rent" signs contain only the brokerage company and the listing agent's contact number. Some agents supplement the signs with flyers containing additional information placed in a box below the signs. However, these flyers are usually limited to a few sheets of paper and generally do not provide the level of detailed information that a shopper may be looking for.

As an alternative or in addition to the flyers, a real estate agent may place the same or additional details about a property on a public communications network such as the Internet and provide an interested party with a Uniform Resource Locator (URL) (i.e., a string of characters that acts as a webpage address where the relevant information may be found). The agent may provide the URL on a commercial sign or on flyers. However, interested parties often lack the time or tools to transcribe a long URL while driving or walking by a commercial sign.

As it has been suggested in US Patent Application No. 2011/10137706, to address the above problem, an agent can print a commercial sign bearing a QR code so that potential buyers can scan the code with their smartphones and be directed to a URL resolving to a website with information about a real estate offering. A QR code is a type of two-dimensional barcode or matrix that allows interested parties to access a specific URL by simply scanning the code with a suitable scanning device. This way, detailed information which cannot fit on limited space advertising material (e.g., flyers or signs) can be provided to the interested parties.

To properly scan a QR code, the scanning device needs to be at a specific proximity to the QR code displayed on a commercial sign. For example, a 2×2 cm barcode can only be scanned from less than 10 cm away, with a scanning device held in stationary position. As such, in the scenario discussed above an interested person, if driving, must park and exit his vehicle, and be within one or two feet of the commercial sign in order to scan the QR code that has been placed on or incorporated in the sign. The steps involved in scanning the code are typically inconvenient and sometimes problematic for the less agile or those with mobility restrictions.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

A system for displaying a QR code in vicinity of a commercial sign is provided. The system comprises a panel comprising a QR code displayed thereon; and a fastener to attach the QR code panel to a signage system such that size of the QR code is larger than a 2×2 cm square where interested parties are able to scan the QR code from more than 10 feet away.

In accordance with one or more embodiments, a method or a computer program product comprising a computer readable storage medium having a computer readable program is provided. The method when performed or the computer readable program when executed on a computer cause functions and operations associated with the above-disclosed system to be performed.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
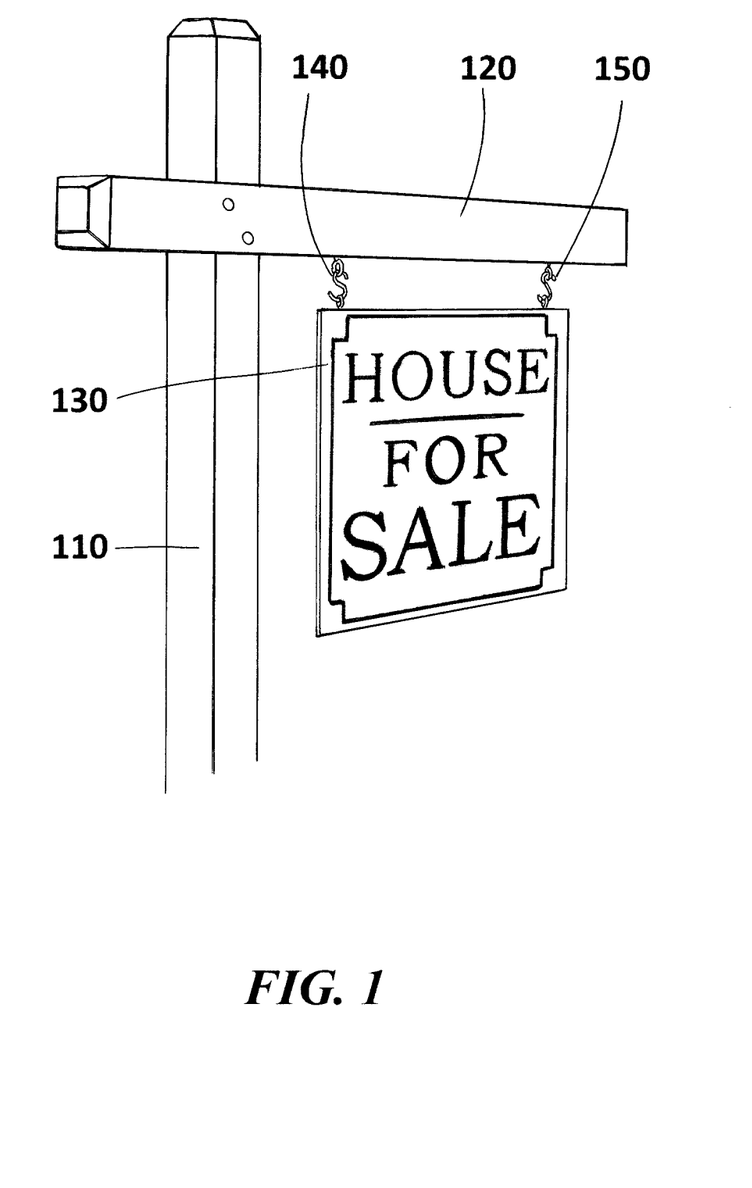
FIG. 1 illustrates a typical real estate sign with a panel hanging on a horizontally extending arm of an upside down L-shape post.

FIG. 1 illustrates a traditional commercial sign containing a stanchion 110 and an extending arm 120 perpendicular to the stanchion 110 where a rectangle sign panel 130 can be hung. This simple signage system can withstand winds and other weather conditions because the panel is able to swing freely in the wind, as it is attached to the perpendicular arm by two short metal chains 140 and 150.

Said signage system is usually placed such that the sign panel is perpendicular to the street in front of the subject. In this position, the printed information on the panel can be seen from a distance by passersby on both sides of the street. However, because of the limited size of the panel and the very large font displayed, the provided information is very limited. To learn more, consumers must get close to the sign to read smaller texts, scan a code, or take a flyer.

Figure 2:
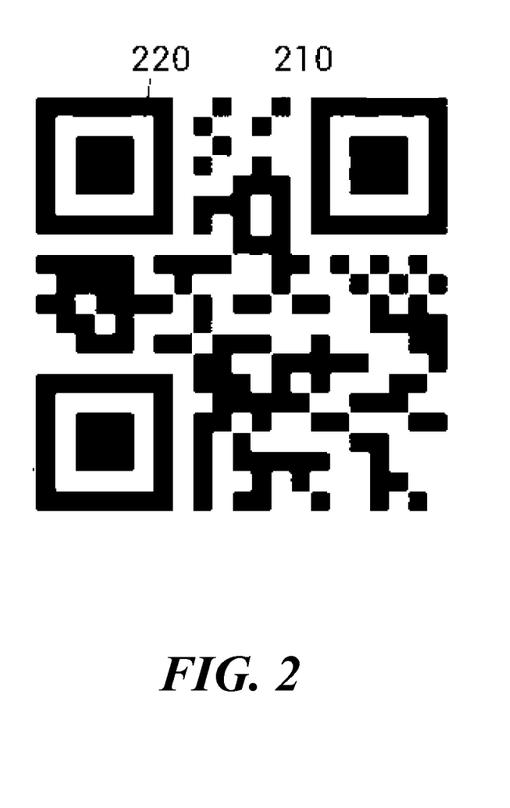
FIG. 2 is an exemplary QR code.

Referring to FIG. 2, a QR code is illustrated. As shown, the QR code includes a two-dimensional code on a two-dimensional panel or surface. The QR code represents information and comprises square dots 210 and patterns 220, which can encode numerals, alphabets and computer binary codes. Because of its two dimensional encoding capability, a QR code can store more information than a traditional UPC barcode of the same size, and thus has become a preferred method of encoding product information in today's commerce.

An agent may choose various printing methods. In a bitmap printing method the bitmaps are images made of dots called pixels, and the amount of pixels (per inch) or dots per inch (DPI) determines the resolution and the size and the clarity of the image. In one embodiment, to increase the scanning success from a far distance, the QR code image resolution in terms of DPI is monitored. The higher the resolution (DPI), the better the likelihood of successful scanning of an enlarged QR code from a distance. As such, in one example, the QR code images are generated in at least 300 DPI format.

Because the density of QR code pixels is directly correlated with the amount of information (e.g., the length of URL, etc.) included in the QR code, merely enlarging a typical QR code may dilute the pixilation details and increase the risk that the scanning device and the reader software will be unable to read the code, especially if the scanning is done from a far distance. That is, the diluted pixilation may cause the scanned results to be too incoherent to process. Further issues and complications may arise if the foreground and the background colors do not have the proper contrast.

In one embodiment, to manage some of the above issues and to further increase scanning success, a vector printing method may be used. Vector QR codes may be made of lines and then filled in with ink. In a vector QR code, regardless of the exact size of the QR code, a box is drawn to the required dimensions and then filled with a color, leaving desirably a perfect clear square. In one implementation, the QR code may be enlarged to sizes that would allow consumers to scan the code from one foot to more than 10 feet Away, for example.

Figure 3:
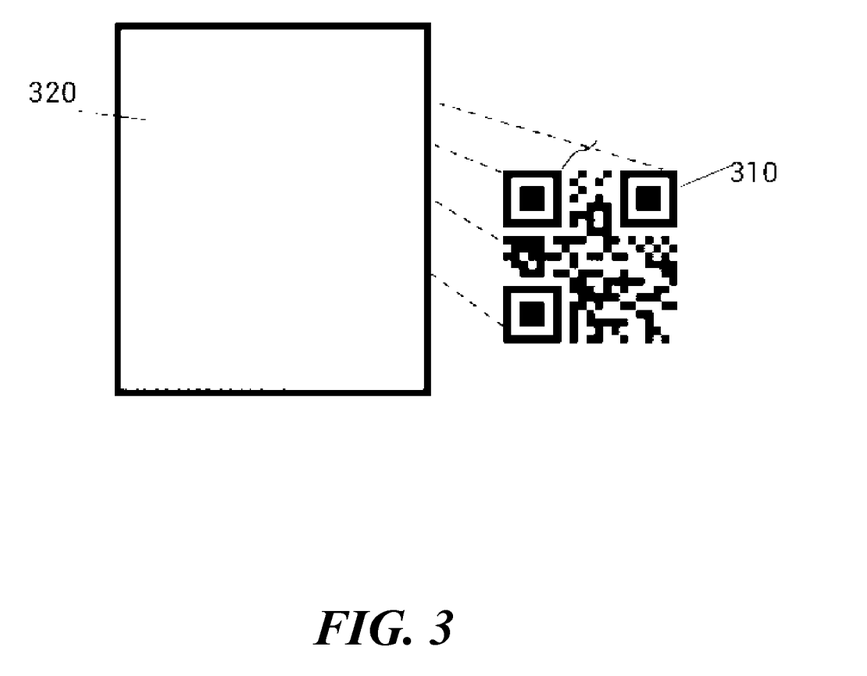
FIG. 3 is an exemplary reusable blank panel and a QR code decal, in accordance with one or more embodiments.

Referring to FIG. 3, in one embodiment, optionally a weatherproof decal 310 may be used to print the QR code. The decal may then be adhered to a blank panel 320 to create a complete QR code panel. This way the QR code may be replaced easily if a new one is needed. The cost of using and maintaining a QR code panel overtime would be relatively low, if the blank panel is made from weatherproof material such as plastic or vinyl, for example, but other types of material suitable for the disclosed functionality and purpose may also be utilized, without detracting from the scope of the claimed subject matter.

Figure 4:
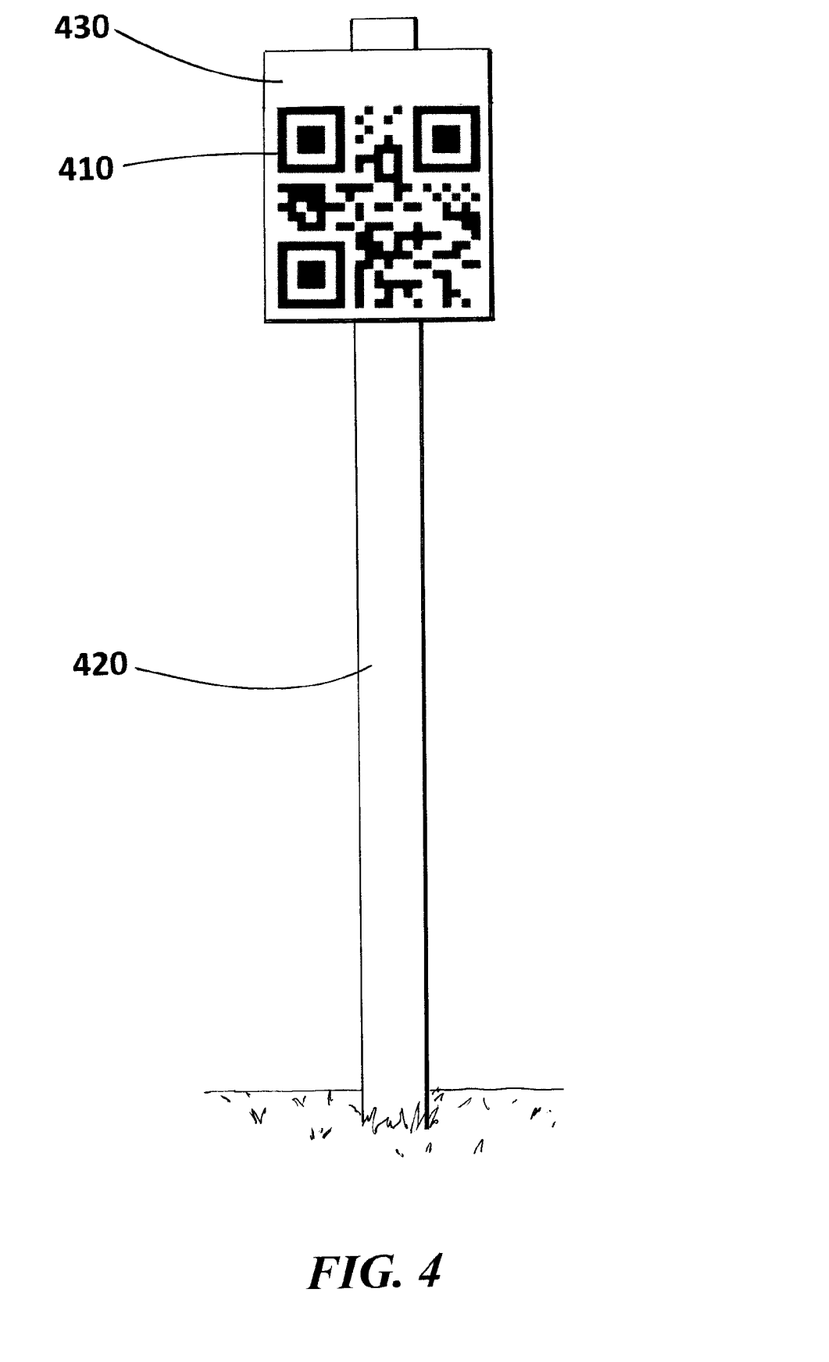
FIG. 4 is an exemplary signage with a QR code panel fastened to the signage, in accordance with one embodiment.

Referring to FIG. 4, in one embodiment, a QR code panel 410 may be fastened directly to the stanchion 420 with a screw 430, or any other type of suitable fastener (e.g., nail, glue, Velcro, etc.) or connecting means. The QR code panel 410, in one embodiment, may be about 8×8 inches large so that its image is scannable from approximately 10 feet or more away. The QR code panel may be placed facing the street so that interested consumers have a full view of the QR code and a better chance of a successful scan as they drive by in their vehicle, desirably without having to exit or park their vehicle to accomplish the scanning task.

Figure 5:
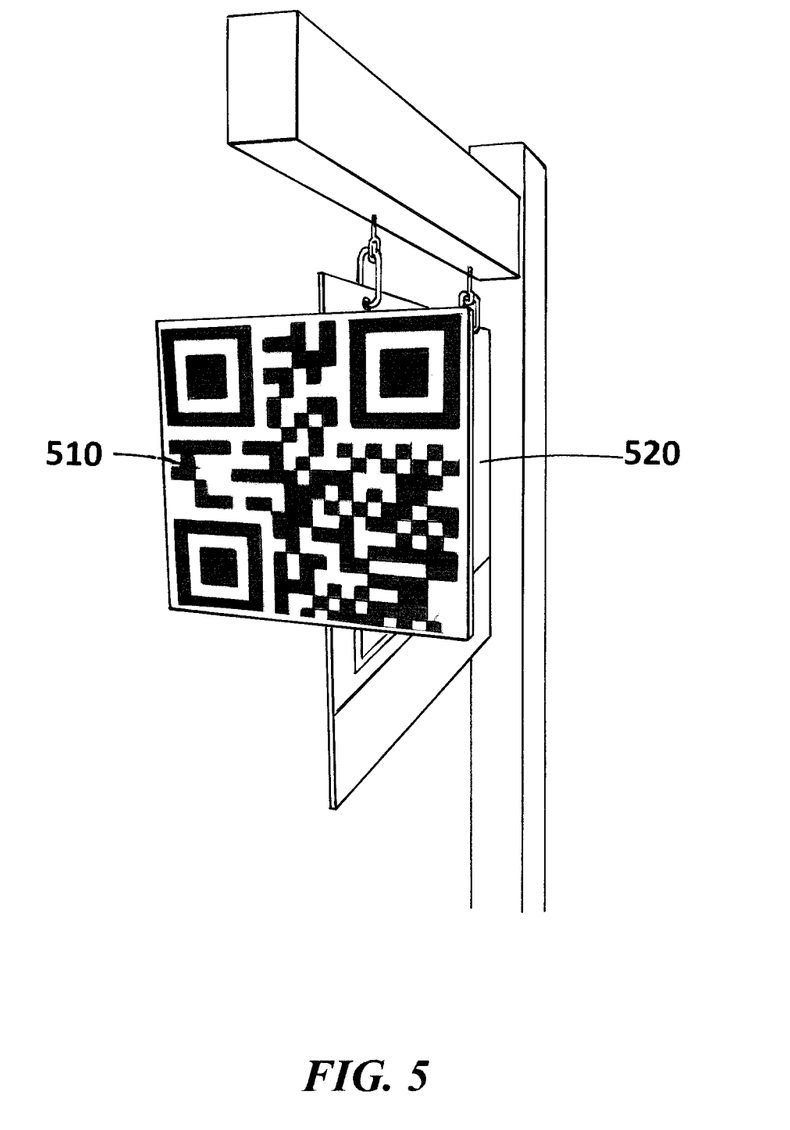
FIG. 5 is an exemplary illustration of the orientation in which a real estate sign is fastened to a QR code, in accordance with one embodiment.
Figure 6:
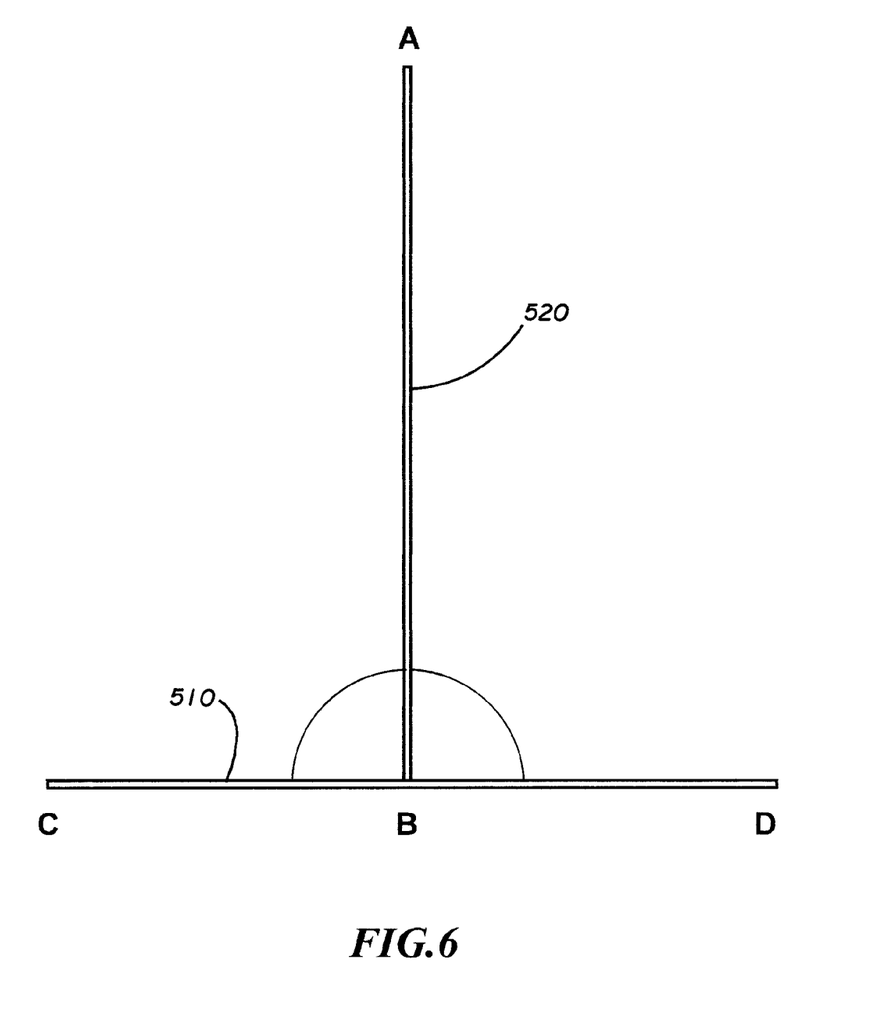
FIG. 6 is cross-sectional image of an exemplary QR code panel fastened at a T angle to a commercial sign panel or display, in accordance with one embodiment.

Referring to FIGS. 5 and 6, in one embodiment, a QR code panel 510 (shown in FIG. 6 as cross-section CD) may be installed perpendicular to a commercial sign panel 520 (shown in FIG. 6 as cross-section AB) by way of a fastener at point B. In this exemplary installation orientation, the QR code panel 510 directly faces the street because the QR code panel 510 is installed parallel to the street as attached to the commercial sign panel 520 which is installed in a perpendicular direction in relation to the street's longitude.

Accordingly, in the above exemplary installation scenario, the QR code panel 510 is easily accessible to potential customers and their scanning devices as they pass by the two panels while driving down the street at a relative speed of 5 to 35 miles per hour. Advantageously, the consumer driving at such a speed and from distances of over 10 feet away may successfully scan the QR code panel 510.

It is noteworthy that in the above exemplary installation, the driver will also easily have the commercial sign panel 520 in his field of view as he approaches or drives towards the sign from a distance (i.e., because the commercial sign panel 520 is installed perpendicular to the street he is driving on), and also as he gets closer he will be able to easily scan the QR code panel 510 facing the street (i.e., because the QR code panel 510 is installed perpendicular to the street he is driving on).

For clarity, in the embodiments shown in FIGS. 4, a QR code panel 510 is directly attached to the side of the stanchion by way of a fastener so that the QR code panel 510 faces the street preferably in parallel (e.g., the longitude of the QR code panel 510 forms an approximately 0 degree angle with the longitude of the street) regardless of the direction in which the commercial sign panel 520 is installed.

In contrast, in FIGS. 5 and 6 another implementation is shown, in which QR code panel 510 is attached to the commercial sign panel 520. To install the QR code panel 510, a fastener having a groove that may, for example, frictionally engage the edge of the commercial sign panel 520 may be used, so that the QR code panel 510 faces the street, when the commercial sign panel 520 is installed approximately perpendicular to the street (e.g., the longitude of the commercial sign panel 520 forms an approximately 90 degree angle with the longitude of the street).

In one embodiment, if the commercial sign panel 520 is for some reason placed parallel to the street, the QR code panel 510 may be hung below the sign panel using one or more suspendable-type fastener (e.g., chains, ropes, plastic extensions, etc.), so that the QR code panel 510 may face the street for easy scanning. In another embodiment, the QR code panel 510 may be, for example, installed on top of or on the horizontal extending arm that is used to hang the commercial sign panel 520.

In one embodiment, the QR code panel 510 may be tilted to form a slightly acute angle with the ground, preferably an angle smaller than 90 degrees but larger than 45 degrees, for example, where the ground around the foot of the stanchion is at the same level or higher than the street's. Where the ground level is lower than the street's, the QR code may be tilted upward to form an obtuse angle with the ground. The exact angle may be determined by the installer after a successful test scanning of the QR code from a designated viewing spot depending on the topography. In other words, the angle and the tilt may also be adjusted depending on the change in the altitude along a street built on a hill, for example. That is, the QR code panel 510 may be installed tilted downward when facing uphill traffic, and installed tilted upward when facing downhill traffic, for example.

Various designs may be utilized to add efficiency to the process of attaching or removing a QR code panel to a post or a sign, in different implementations. Referring back to FIGS. 5 and 6, for example, a plastic fastener of monolithic or multi-piece construction may be pre-glued to the backside of the QR code panel 510 at point B. In one example, the fastener may comprise two quarter-round plastic rods with a groove separating them. The QR code panel 510 may be attached to the vertical street-facing edge of the commercial sign panel 520, such that the commercial sign panel's edge is received by and frictionally held in the groove of the fastener, for instance.

In the exemplary embodiment disclosed above, force of friction or other connecting mechanism keeps the QR code panel attached to the sign panel. In another embodiment, a thumbscrew (or similar means) may be used to hold the QR code panel attached to the commercial sign. In yet another embodiment, a combination of various fastening means may be used. It is noteworthy that the above implementation and embodiments are exemplary in nature and that other designs or materials may be employed to construct different embodiments. For example, the quarter round rods may be made in different shapes or made of wood or other suitable material that can be pre-glued or pre-attached to the QR code panel.

Figure 7:
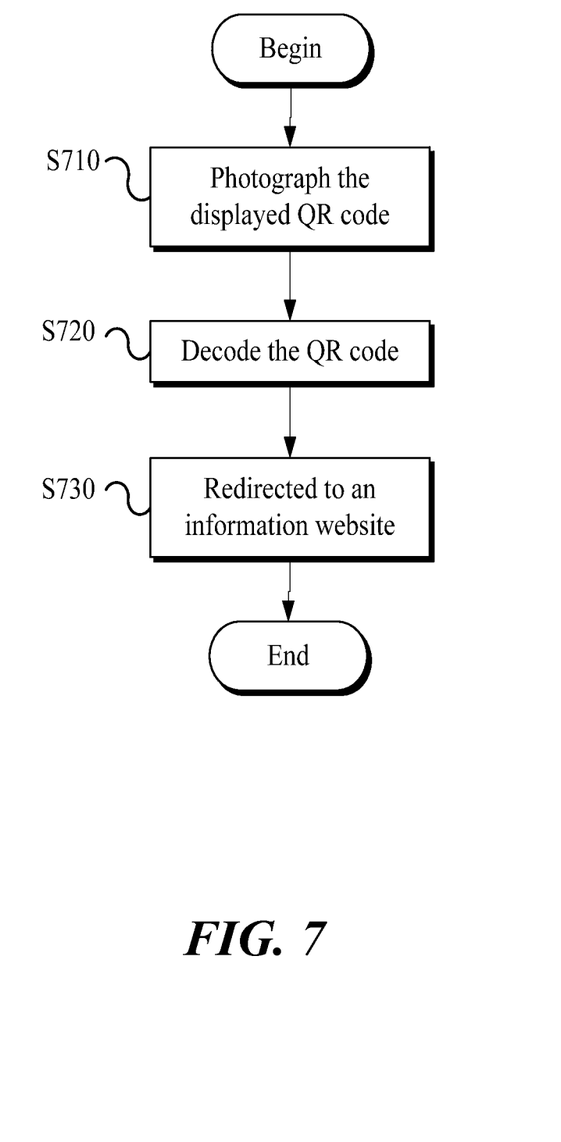
FIG. 7 is a flow diagram of a method of scanning a QR code from a distance, in accordance with on embodiment.

Referring to FIG. 7, in one example scenario, a driver moving towards a QR code panel installed in accordance with one or more embodiments disclosed herein would stop or slow down his vehicle as he approaches a distance of approximately one to more than 10 feet away. Optionally, without exiting the vehicle, the person would photograph or otherwise capture an image of the QR code with a scanning device or a computing system (e.g., a smartphone with a digital camera) (S710). A scanner software (e.g., Barcode Scanner, Optiscan, ScanLife, etc.), that is executing or has been pre-installed on the scanning device or the computing system, may decode and analyze the QR code's image and extract the encoded information (S720). If the decoded information includes a URL, the scanner software may automatically open a browser and direct the buyer to the information website resolved by the URL (S730).

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine Referring to FIGS. 8A and 8B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Figure 8A:
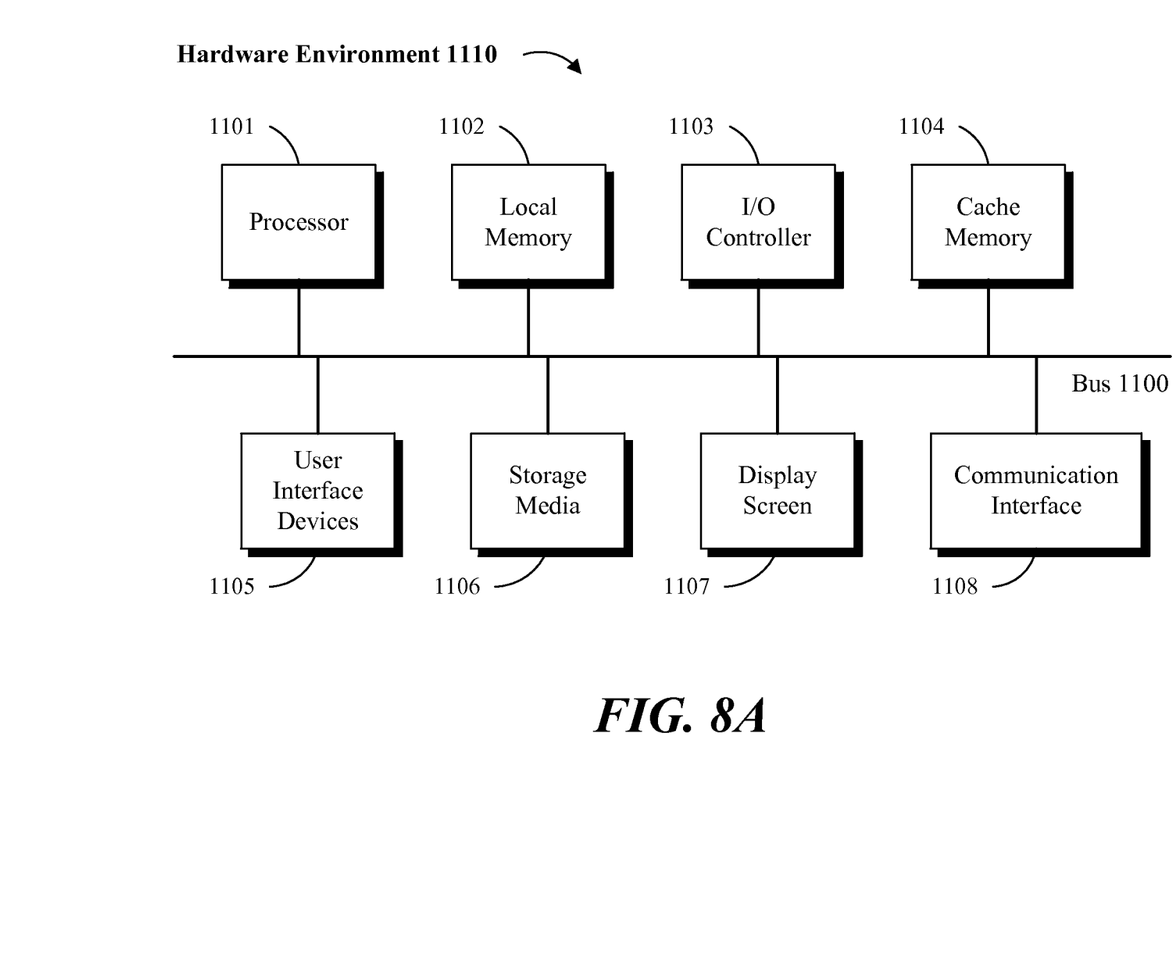
FIGS. 8A and 8B are block diagrams of hardware and software environments in which the disclosed systems and methods may operate, in accordance with one or more embodiments.

Referring to FIG. 8A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Figure 8B:
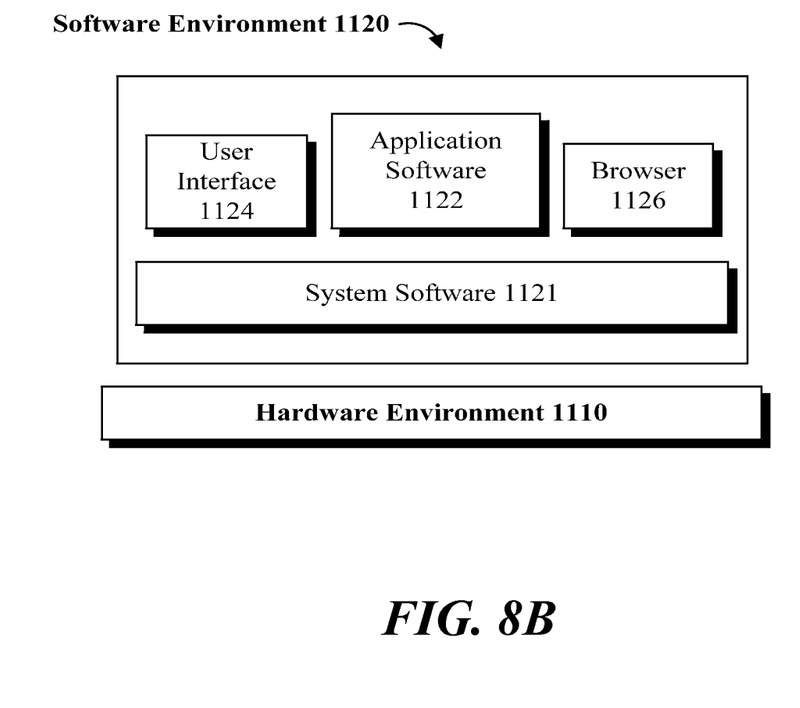

Referring to FIG. 8B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A system for displaying a QR code in vicinity of a commercial sign, the system comprising:
    a panel comprising a QR code displayed thereon; and
    a fastener to attach the QR code panel to a signage system such that size of the QR code is larger than a 2×2 cm square where interested parties are able to scan the QR code from more than 10 feet away,
    wherein the signage system comprises a second panel that is mounted in a first position with respect to the QR code panel, such that in the first position a first surface of the second panel faces a first direction, while a first surface of the QR code panel faces a second direction, the first direction being different than the second direction.

2. The system of claim 1, wherein the QR code is an individual panel attached to the signage system and is placed facing a street in an orientation approximately parallel to the street, so that an optical lens of a portable scanner captures an image of the QR code clearly from more than 10 feet away while moving at a first speed.

3. The system of claim 1, wherein the QR code panel is attached to a signage system, wherein the signage system comprises at least a pole for supporting installation of a sign including the second panel.

4. The system of claim 3, wherein the fastener comprises a first side permanently attachable to a back surface of the QR code panel and a second side opposite to the flat side removably attachable to a signage attached to the pole.

5. The system of claim 4, wherein the fastener's second side comprises a groove configured to frictionally receive an edge of the signage attached to the pole.

6. The system of claim 5, wherein when an edge of the signage is received in said groove, the groove firmly holds the edge of the signage so that the QR code panel is removably installed on the signage.

7. The system of claim 6, wherein when the QR code panel is removably installed on the signage, the QR code panel is longitudinally positioned approximately parallel to the street.

8. The system of claim 7, wherein the signage is positioned in an orientation that is approximately perpendicular to the street.

9. The system of claim 1, wherein the QR code panel is tilted at a first angle depending on at least one of ground topography or sunlight reflection in ambient environment where the QR code panel is installed.

10. The system of claim 9 wherein the QR code panel is tilted upwardly if the QR code panel is facing a downhill direction of traffic and wherein the QR code panel is tilted downwardly if the QR code panel is facing an uphill direction of traffic.

11. The system of claim 1, wherein the second panel facing the first direction is viewable from a first point of view, and the QR code panel facing the second direction is viewable from a second point of view.

12. The system of claim 11, wherein the QR code panel is positioned with respect to the second panel in a manner that a viewer is able to view the second panel from the first point of view and to scan the QR code panel successfully from the second point of view, where the first point of view is different than the second point of view.

13. The system of claim 11, wherein a viewer scanning the QR code panel from the second point of view is unable to fully view the face of the second panel from the second point of view because the face of the second panel is best visible from the first point of view.

14. A method for displaying a QR code in vicinity of a commercial sign, the method comprising:
providing a panel comprising a QR code displayed thereon; and
attaching the QR code panel to a signage system such that size of the QR code is larger than a 2×2 cm square where interested parties are able to scan the QR code from more than 10 feet away,
wherein the signage system comprises a second panel that is mounted in a first position with respect to the QR code panel, such that in the first position a first surface of the second panel faces a first direction, while a first surface of the QR code panel faces a second direction, the first direction being different than the second direction.

15. The method of claim 14, wherein the QR code is an individual panel attached to the signage system and is placed facing a street in an orientation approximately parallel to the street, so that an optical lens of a portable scanner captures an image of the QR code clearly from more than 10 feet away while moving at a first speed.

16. The method of claim 14, wherein the second panel facing the first direction is viewable from a first point of view, and the QR code panel facing the second direction is viewable from a second point of view.

17. The method of claim 16, wherein the QR code panel is positioned with respect to the second panel in a manner that a viewer is able to view the second panel from the first point of view and to scan the QR code panel successfully from the second point of view, where the first point of view is different than the second point of view.

18. The method of claim 16, wherein a viewer scanning the QR code panel from the second point of view is unable to fully view the face of the second panel from the second point of view because the face of the second panel is best visible from the first point of view.

\* \* \* \* \*